United States Patent [19]

Hemphill et al.

[11] Patent Number: 4,984,178

[45] Date of Patent: Jan. 8, 1991

[54] CHART PARSER FOR STOCHASTIC UNIFICATION GRAMMAR

[75] Inventors: Charles T. Hemphill, Coppell; Joseph W. Picone, Plano, both of Tex.

[73] Assignee: Texas Instruments Incorporated, Dallas, Tex.

[21] Appl. No.: 312,835

[22] Filed: Feb. 21, 1989

[51] Int. Cl.$^5$ ............................................... G10L 9/00
[52] U.S. Cl. ................................. 364/513.5; 364/419; 381/42; 381/43
[58] Field of Search ............... 364/513.5, 419; 381/42, 381/43

[56] References Cited

U.S. PATENT DOCUMENTS

| 4,718,092 | 1/1988 | Klovstad | 381/43 |
| 4,718,093 | 1/1988 | Brown | 381/43 |
| 4,783,803 | 11/1988 | Baker et al. | 381/42 |
| 4,852,173 | 7/1989 | Bahl et al. | 381/43 |

OTHER PUBLICATIONS

Young, S. J. et al., "Speed recognition in VODIS II", Proceedings IEEE International Conference on Acoustics, Speech and Signal Processing, 1988, 441–444.

Querre, M. et al., "Versatile speaker–dependent continuous speech understanding system", Proceedings IEEE International Conference on Acoustics, Speech and Signal Processing, 1988, 303–306.

Trehan, R. et al., "A paralle chart parser for the committed choice non–deterministic logic languages", IEEE Proceedings of the Fifth International Conference and Symposium: Logic Programming, Seattle, WA, Aug. 1988, 212–232, vol. 1.

Grishman, R. et al., "Evaluation of a parallel chart parser", 10th International Conference on Computational Linguistics, Stanford, CA, Jul. 1984, 393–397.

J. Earley, "An Efficient Context–Free Parsing Algorithm", Feb., 1970, vol. 13, No. 2, pp. 94–102, Communications of the ACM.

Paeseler, A., "Modification of Earley's Algorithm for Speech Recognition", Proc. of NATO ASI, Bad Windshein, 1987, pp. 1–8.

Aho et al., "A Minimum Distance Error–Correcting Parser for Context–Free Languages", SIAM J. Comput. vol. 1, No. 4, Dec. 1972, pp. 305–312.

Primary Examiner—Clark A. Jablon
Attorney, Agent, or Firm—L. Joy Griebenow; James T. Comfort; Melvin Sharp

[57] ABSTRACT

A chart parser is disclosed which incorporates rule and observation probabilities with stochastic unification grammars. The parser operates frame synchronously to provide top-down hypotheses and to incorporate observation probabilities as they become available. Because the language model produces multiple explanations of the speech data between frames, the prediction and combination of rules may create cycles in a graph representing the best scores. Score calculation includes the detection of these cycles and propagation of the best scores to the next frame. The algorithm creates no more states than a nonprobilistic chart parser, and remains linear for regular grammars and cubic in the worst case for CFGs. The parser allows a direct integration of statistical speech information and linguistic constraints within the same language model, while the language model permits a generalization of HMM-type models. The efficiency of the parser makes it applicable to multiple levels of a spoken language system (e.g., sentence, word, phoneme, and phone levels).

33 Claims, 3 Drawing Sheets

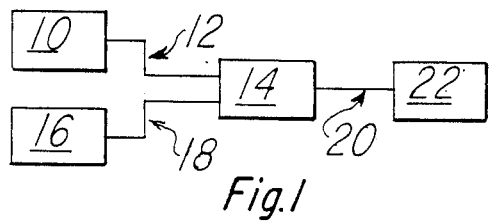
Fig.1
| 0 | SENTENCE GRAMMAR LEVEL |
| 1 | WORD GRAMMAR LEVEL |
| 2 | PHONEME GRAMMAR LEVEL |
| 3 | PHONE GRAMMAR LEVEL |
| ⋮ | ⋮ |
| $\ell$ | REFERENCE FRAME GRAMMAR LEVEL |
Fig.2
$S \rightarrow nv$
$n \rightarrow boys$
$v \rightarrow sleep$
$v \rightarrow leap$
Fig.3A
$_0 boys_2$   $-.04$
$_0 boys_3$   $-.03$
$_2 sleep_5$  $-.05$
$_3 leap_5$   $-.03$
Fig.3B
$_0{}^a{}_1{}^{or}{}_2{}^b{}_3{}^{or}{}_4{}^d{}_5$
Fig.4A
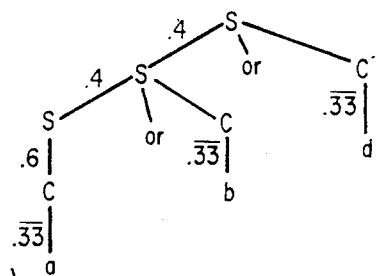
Fig.4B
$S \xrightarrow{.6} C$
$S \xrightarrow{.4} S$
$S \xrightarrow{.33} a;b;d$
Fig.4C
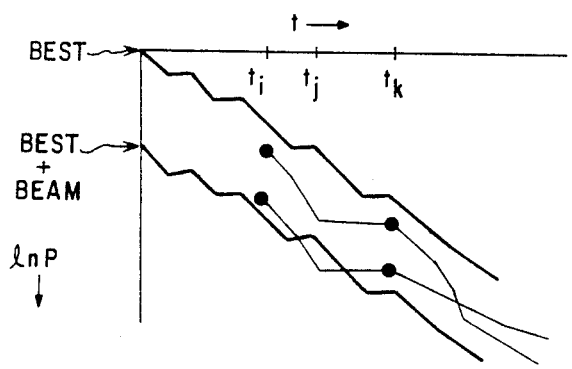
Fig.5

```
                    PROBABILITIES:
                    STARTING  ENDING i = 0
 1   ₀S → ·₀ n v          0.00     0.00
 2   ₀n → ·₀ boys         0.00     0.00
         i = 1
         i = 2                              ₀boys₂      −.04
 3   ₀n → boys·₂          0.00    −.04
 4   ₀S → n·₂ v           0.00    −.04
 5   ₂v → ·₂ sleep       −.04     −.04
 6   ₂v → ·₂ leap        −.04     −.04
         i = 3                              ₀boys₂      −.03
 7   ₀n → boys·₃          0.00    −.03
 8   ₀S → n·₃ v           0.00    −.03
 9   ₃v → ·₃ sleep       −.03     −.03
10   ₃v → ·₃ leap        −.03     −.03
         i = 4
         i = 5

11   ₂v → sleep·₅        −.04     −.09
12   ₃v → leap·₅         −.03     −.06
13   ₀S → n₂ v·₅          0.00    −.09
14   ₀S → n₃ v·₅          0.00    −.06
```

*Fig. 3C*

$$
\begin{array}{lll}
& S \rightarrow \bullet C, \emptyset, & .6 \\
& S \rightarrow \bullet S\text{ or }C, \emptyset, & .4 \\
1+i\ \Big\{ & C \rightarrow \bullet a, .6, & .6 + \overline{.33} \\
& C \rightarrow a \bullet, .6, \quad a & .6 + \overline{.33} \\
& S \rightarrow C \bullet, \emptyset, & .6 + \overline{.33} \\
1+i\ \Big\{ & S \rightarrow S \bullet \text{ or } C, \emptyset, & .4 + .6 + \overline{.33} \\
& S \rightarrow S \text{ or } \bullet C, \emptyset, \quad \text{or} & .4 + .6 + \overline{.33} \\
1+i\ \Big\{ & C \rightarrow \bullet b, .4 + .6 + \overline{.33}, & .4 + .6 + \overline{.33} + \overline{.33} \\
& C \rightarrow b \bullet, .4 + .6 + \overline{.33}, \quad b & .4 + .6 + \overline{.33} + \overline{.33} \\
& S \rightarrow S \text{ or } C \bullet, \emptyset, & .4 + .6 + \overline{.33} + \overline{.33} \\
1+i\ \Big\{ & S \rightarrow S \bullet \text{ or } C, \emptyset, & .4 + .4 + .6 + \overline{.33} + \overline{.33} \\
& S \rightarrow S \text{ or } \bullet C, \emptyset \quad \text{or} & .4 + .4 + .6 + \overline{.33} + \overline{.33} \\
1+i\ \Big\{ & C \rightarrow \bullet d, .4 + .4 + .6 + \overline{.33} + \overline{.33} & .4 + .4 + .6 + \overline{.33} + \overline{.33} + \overline{.33} \\
& C \rightarrow d \bullet, .4 + .4 + .6 + \overline{.33} + \overline{.33} \quad d & .4 + .4 + .6 + \overline{.33} + \overline{.33} + \overline{.33} \\
& S \rightarrow S \text{ or } C \bullet, \emptyset, & .4 + .4 + .6 + \overline{.33} + \overline{.33} + \overline{.33}
\end{array}
$$

*Fig. 4D*

CHART PARSER FOR STOCHASTIC UNIFICATION GRAMMAR

BACKGROUND OF THE INVENTION

1. Field of the Invention

This invention relates to spoken language interfaces, and more particularly to a spoken language processor containing a chart parser that incorporates rule and observation 10 probabilities with stochastic unification grammars.

2. Description of the Related Art

It has been the goal of recent research to make machine understanding of spoken language possible through a tight coupling between speech and natural language systems. The difficulty posed by this coupling lies in trying to integrate statistical speech information with natural language grammars. Furthermore, speech systems have come to rely heavily on grammar constraints to accurately recognize connected speech.

Language modeling has become an essential element in high performance, speaker-independent, continuous speech systems. Until recently, speech recognition systems have primarily used Finite State Automatons (FSAs) as the language model. These models offer efficient processing, easily accommodate observation probabilities, and permit simple training techniques to produce transition probabilities. Attempts to model spoken language with FSAs have resulted in stochastic language models such as bigrams and trigrams. These models provide good recognition results when perplexity can be minimized, but preclude any direct support for spoken language systems by eliminating the semantic level.

Language models have traditionally proven valuable in natural language systems, but only during the past decade have computationally-oriented, declarative grammar formalisms become widely available. These formalisms, generally known as unification grammars, offer great flexibility with respect to processing for both parsing and generation. Unification grammars have allowed the close integration of syntax, semantics, and pragmatics. These grammars are especially significant for spoken language systems because syntactic, semantic, and pragmatic constraints must be applied simultaneously during processing. Discourse and domain constraints can then limit the number of hypotheses to consider at lower levels, thereby greatly improving performance.

Several efforts have been made to combine Context-Free Grammars (CFGs) and unification grammars (UGs) with statistical acoustic information. Loosely coupled systems, such as bottom-up systems or word lattice parsers, have produced nominal results, primarily due to time alignment problems. Top-down constraints from CFG's have been integrated with speech using the Cocke-Younger-Kasami (CYK) algorithm, but this algorithm has bad average time complexity (cubic). This complexity becomes especially detrimental with frame synchronous parsing where the number of input hypotheses under consideration is typically large. For example, a person's average speech input is 4–5 seconds long, which corresponds to 400–500 frames. When cubed, those 400–500 frames yield 64,000,000–125,000,000 processing steps to recognize an input.

The first algorithm that had $N^3$ time complexity was the CYK algorithm. With natural language systems, N is traditionally words; however with speech systems, N is equal to frames, which are the fundamental time units used in speech recognition. The algorithm was significant in that it provided a time synchronous algorithm for speech recognition which improved accuracy because the processor did not have to be concerned about how the words fit together. The CYK algorithm is very simple in that it resembles matrix multiplication. Unfortunately it always takes $N^3$ time, rather than linear time, even when processing a regular grammar. Additionally, the CYK algorithm is exhaustive; it systematically expands everything whether it will be needed or not. Such an algorithm uses a great deal of processing time and memory space.

Earley's algorithm (J. Earley, 'An Efficient Context-Free Parsing Algorithm',Comm. of the ACM, Vol. 13, No. 2, Feb. 1970, pp. 94–102) is one of the most efficient parsing algorithms for written sentence input and can operate in linear time for regular grammars. It was one of the first parsing methods that used a central data structure, known as a chart, for storing all intermediate results during the parsing process of a sentence. Subsequently chart parsers were widely used in natural language systems for written input.

Due to the variability and ambiguity of a spoken input signal, modified algorithms were created to improve on Earley's algorithm and to adapt it to spoken language recognition. An example of such a modified algorithm is shown in A. Paeseler, 'Modification of Earley's Algorithm for Speech Recognition', Proc. of NATO ASI, Bad Windsheim, 1987. Paeseler's algorithm combines probabilities in context-free grammars based on Earley's algorithm but it does not do so optimally due to certain defects in the algorithm. One such defect involves the calculation of probabilities. For context-free grammars, a nonterminal symbol may rewrite to another nonterminal symbol without having to go through a terminal symbol. Probabilities can therefore occur from many directions in the grammar. In order to progress in the parsing of the input, those subsequent symbols must also be expanded. But in order to expand those subsequent symbols, according to Paeseler's algorithm, the best probability must be known, otherwise if a better probability appears, the parsing must be redone. This means potentially an exponential amount of work, which is highly undesirable.

SUMMARY OF THE INVENTION

In view of the above problems, the primary purpose of the present invention is to provide a chart parser that incorporates rule and observation probabilities with stochastic unification grammars, thereby enabling the language processor to increase accuracy in spoken language understanding by exploiting all knowledge sources simultaneously, improve the languages that can be represented and to improve a speech recognition processor's representational power.

Another goal of the present invention is to provide a chart parser that correctly computes hypothesis probabilities in an efficient manner for CFGs and stochastic unification grammars, by interleaving the search for explanations of symbols from both the top down and from the bottom up.

A further goal is the provision of a chart parser capable of correctly applying CFGs and UGs to a speech recognition problem in an efficient manner, saving processing time and memory space. It saves time and memory space by expanding symbols only once. Thus the processor often operates in linear or quadratic time and only in the worst case does it take $N^3$ processing steps to recognize an input as oppposed to either $N^3$ processing steps all the time or, as seen empirically from Paeseler's algorithm, exponential processing steps, either of which are quite undesirable for real-time systems.

The present invention extends Earley's basic CFG parsing algorithm to combine rule and observation probabilities with the use of unification grammars. This retains the Earley algorithm complexity while extending the results to spoken input recognition: linear for regular grammars, quadratic for unambiguous CFGs, and cubic for general CFGs. The complexity results also hold for unification grammars that do not include arbitrary nesting of features. Because of this efficiency, the algorithm applies to multiple grammar levels of a spoken language system.

In accordance with the invention, a method is disclosed for combining unification grammars with rule and observation probabilities to enable a processor to recognize a speech signal input for several levels of a language model. The present invention loads the grammars and the reference data from a disk or appropriate memory space into internal data structures for access by the parser. The present invention then enables the chart processor to predict all start symbols and parse for all input frames. The parse function requires that the processor alternately repeat a predict function and a complete function until no new states can be added. If the processor is on the bottom grammar level, then it will score any terminal symbols with respect to the input frame. If the processor is not on the bottom level, then it will predict the terminal symbols at the next lower level and proceed to parse. The processor will scan observations from a lower grammar level into the current grammar level. It will complete active states as new complete states become available and return to the next higher grammar level the complete states from symbols of the current grammar level.

The present invention assigns probabilities to the hypotheses that it next wants to explore. It also employs a beam pruning technique, well-known in the art, and a delayed commitment in the score caluclation to determine the most probable correct response (speech recognition). Delayed commitment is not continuously calculating the best probability, but instead setting reminder pointers to the previous states that need a particular symbol so that when the processor needs to know the probability, it can trace back and then decide, having all the information at hand, which one actually was the higher probability.

These and other features and advantages of the invention will be apparent to those skilled in the art from the following detailed description of a preferred embodiment, taken together with the accompanying drawings, in which:

DESCRIPTION OF THE DRAWINGS

FIG. 1 is a block diagram showing a speech recognition processor which employs the present invention;

FIG. 2 is a stack diagram demonstrating a possible grammar level structure and positioning as used by the present invention;

FIGS. 3A–C show an example demonstrating frame synchronous parsing using probabilities employed by the present invention;

FIGS. 4A–D show an example showing a typical left recursive rule showing rule probabilities correctly computed by the present invention; and FIG. 5 is a graph showing the effect of chart parsing on pruning as employed by the present invention.

DETAILED DESCRIPTION OF A PREFERRED EMBODIMENT

The present invention discloses a method which makes use of an algorithm (discussed below) which includes a parsing subalgorithm to affect the central data structure of a spoken language processor. As seen in FIG. 1, an input device 10 receives input from a user and transmits the input along connecting element 12 to processor 14. Processor 14 contains a central data structure, known as a chart 24, not shown, where the algorithm is implemented. The algorithm instructs processor 14 to load a grammar, a lexicon, probabilities, and other appropriate operating data from processor memory 16. Processor 14 communicates with processor memory 16 via connecting element 18. After processor 14 has completed the algorithm and has identified the input from input device 10, processor 14 transmits an output to output device 22 via connecting element 20.

The grammar contains rules which define the appropriate grammar used and is well known in computational linguistics arts. The lexicon contains definitions of the terminal symbols of the grammar. These terminal grammar symbols are preferably word classification descriptors, such as verb, noun, and article, with syntactic and semantic information. The terms of the lexicon are assigned features, such as tense, plurality, or definiteness. Some elements of the lexicon contain detailed descriptions of the types of words which are valid in certain circumstances. The actual words, also called atoms, are defined elsewhere, such as in a knowledge base.

The grammar and lexicon, taken together, can be compiled without reference to a particular domain. The result is to define a spoken language reference which can be a fairly complex subset of a language. Since the rules for the grammar and lexicon refer only to word types, the number of rules is relatively small, even at execution time, so they run quickly.

It should be noted that "input" may be spoken, written, typed, etc. "Input device" may be a terminal, microphone, phonograph, etc. "Output" may be a processor response written to a screen, an oral response by the processor, a processor action, etc. The "output device" may be a screen, another processor, an audio speaker, a robotic arm, etc. In the implementation of the preferred emmbodiment of the present invention, the input is spoken, the input device is a microphone, the output and output device involve a processor response written to a screen. However, this should not in any way limit the present invention.

Before considering the algorithm of the present invention, two definitions are needed. First, one defines a stochastic unification grammar which is based on the definition of stochastic context-free grammar and is described by the generalization that the symbols are not restricted to atomic symbols but can be feature-value pairs or feature sets. Specifically, a "stochastic unification grammar" is a four-tuple $G_s = (N, T, P_s, S)$, where N and T are finite and sets of nonterminals and terminals, $S \subset N$ is the set of start symbols, and $p_s$ is a finite set of stochastic productions each of which is of the form A, p→α, where A∈N and β∈(N∪T)*, and p is the probability of applying the rule. Let the set of probabilities of all k stochastic productions in $P_s$ with A on the left be $\{p|A,p_i\rightarrow\beta_i, i=1, \ldots, k\}$. Then $0<p_i\leq 1$ and $$\sum_{i=1}^{k} p = 1.$$

The nonterminals and terminals are feature-value pairs.

Next, one defines a "feature set" as a set of "feature-value pairs" of the form F:V, where f is a constant (0-ary function or atomic symbol) and V is either a constant, a variable, or a feature set. A feature set may be indexed with a variable using the notation X+FS, where X is a variable and FS is a feature set. The variable may be used elsewhere to denote the occurence of the same feature set.

The preferred embodiment of the present invention is as follows:

INPUT:
A vector of grammars, G, $G_o, \ldots, G_l$.
An ending frame n.

OUTPUT:
A matrix of state sets E, 1 rows and n columns., the best score for S of $G_o$.

METHOD:
1. Let i=0, l=0, $\sigma_o$=0.0 (log probability). Make $E_{l,o}$ empty for all l.
2. For each s∈S, predict [i,—,s,—,—,—,—,$\sigma_o,\sigma_o$].
3. If i=n and [0,p,s,α,j,ε,i,$\sigma_o,\sigma$]∈$E_{l,n}$, where s∈S, then return E and σ.
4. Parse (i,E,l ).
5. Go to (3).

PARSE:
INPUT:
   The matrix of state sets E, a level l, and a frame index i.
OUTPUT:
   An extra state set in E, $E_{l,i+1}$.
METHOD:
   1. Repeat the following two steps until no new states can be added:
      (a) Predict
      (b) Complete
   2. Hypothesize.
   3. Scan.
   4. Set i=i+1
   5. Repeat the following two steps until no new states can be added:
      (a) Predict
      (b) Complete In implementing the above algorithm, the processor reads a vector of grammars representing any number of grammar levels. Looking for the moment at FIG. 2, an example of grammar levels is shown. The highest level is sentence grammar level 0. Below that is word grammar level 1, and below that is phoneme grammar level 2. The next lower level shown is phone grammar level 3. Each lower level contains narrower and narrower portions of the inputted data until the lowest level or reference frame grammar level 1 is reached.

A reference frame is the fundamental time unit set by the speech developer. For example, the fundamental time unit may be 20 milliseconds. This means that every 20 milliseconds the processor will characterize speech data with a vector of length 18 or so, floating point features of various characteristics of the speech signal and will match those characteristics to the expected data or symbols which correspond to words.

Returning to the algorithm, before the processor has completed the input, it generates an output of a matrix of state sets E which is 1 rows corresponding to the number of levels and N columns corresponding to the number of input frames of speech. Furthermore the processor will output a score of for best sentence explanation at grammar level 0 (FIG. 2), which is the sentence level grammar.

After reading the vector of grammars, in the preferred embodiment, the processor will then input an ending frame indicator n. Although this is not required, it makes the algorithm more complete. Furthermore, there are other means by which the end point can be indicated to the processor.

At this point, the processor initializes all of the state sets to empty at all levels of the first frame and sets the initial probability to 0.0 which is a logarithmic probability. The processor sets the level to 0 (starts at the sentence grammar level), and sets the frame to 0. This completes initialization. For each start symbol of grammar, the processor predicts the current frame's initial and final probability as 0.0.

If the processor has reached the end of the input at this point, which is unlikely the first time the processor proceeds through the algorithm, and if the processor has found a state corresponding to a start symbol which is complete, the processor can then explain the whole set input and can output that state and its score. The processor then parses, given the start frame, the state set, and the level.

In the parse algorithm, the processor inputs the matrix of state sets, a level l, a frame index i, and outputs an extra state for the next input frame request i+1. This cycle is repeated until no new predicted and completed states are added. The cycle produces some terminal symbols that are hypothesized at the next lower grammar level. The processor hypothesizes the terminal symbols from this level as start symbols at the next lower grammar level. It returns a set of observations which are scanned into the waiting states. In the preferred embodiment, the frame counter is then incremented because any state that completes will do so at the next frame. It should be noted, however, that the frame counter may be incremented at other times during the execution of the algorithm depending on how one wants to keep track of the frames. At this point, either the states are complete or are reported as observations to the next higher grammar level. They may also still be active (not completed) and be placed in a pending list for processing during the next cycle.

Returning again to FIG. 2, the processor looks at the inputted grammar and sees that there is a symbol, say S, that corresponds to a sentence. The processor proceeds to the parse function, does the prediction and completion, and finds out that it needs some words which are terminal symbols in the sentence grammar level. The processor then calls the hypothesizer with that set of words, which also are start symbols at the next lower level—level 1 in this case. Then the processor predicts and completes grammar rules for the words which are composed of phonemes and when it finds a set of phonemes which are terminal symbols, it then calls itself at grammar level 2 which has phoneme symbols as start symbols. This continues until the level which has Hidden Markov Model (HMM) grammars. HMM grammars have reference vectors symbols corresponding to reference vectors as their terminal symbols. The processor then scores these reference vectors and gets probabilities for the frame and returns those as observations to the next higher level. Those observations are scanned into that next higher level. Through the next iteration, the processor predicts and completes those states that were advanced. This continues until all of the input has advanced up to sentence grammar level 0 and advanced S over several time frames to cover all of the input data. At this point, the processor has completed its parse and outputs its hypothesis of the spoken input.

There are four basic functions in addition to parse and compute, in the preferred embodiment of the present invention; three of them use another function called add. Explanations of each of those different functions are given below. Assume a chart state is of the form $[f,p,A,\alpha,j,\beta,i,\sigma_o,\sigma]$, where f is the starting frame, p is the production number, A is the left hand side (LHS) of the rule, $\alpha$ is a string of symbols that have been completed, j is the length of $\alpha$, $\beta$ is the remainder of the right hand side (RHS) symbols, i is the ending frame of this state, $\sigma_o$ is the initial probability, and $\sigma$ is the accumulated probability. Further assume all symbols are at level 1 unless otherwise indicated.

| predict | |
|---|---|
| for all | $[f,p,A,\alpha,j,B_1\alpha,i,\sigma_o,\sigma]$ |
| and rules | $p':B_2,\eta \rightarrow \gamma$ |
| and | unify $(B_1,B_2,B_3)$ |
| add | $[i,p',B_2,\epsilon,O,\gamma,i,\sigma,\sigma+\eta]$ |

To predict a symbol using unification grammars, the processor has at least one state that is looking for a symbol B; and has a rule p' which begins or has at its lefthand side the symbol $B_2$, where B and $B_2$ unify to produce a new unified symbol $B_3$. If $B_1$ and $B_2$ are atomic symbols for context-free grammars, then they are unified by default. Next the set of symbols is added to the set of states under consideration. The new state begins at the ending state of the input state which is i, rule number p', with a lefthand side symbol $B_3$, the number of symbols processed as 0 and an empty string of symbols to be processed which is the and corresponds to the right hand side of the rule. This is what the processor needs to see to indicate it has seen $B_3$. $\epsilon$ is a string of 0 or more terminals and nonterminals In this case the ending frame is also the current frame because the processor has not processed anything. The beginning probability is the ending probability plus the rule probability of symbol $B_2$. This is especially important for left recursive rules. Subtracting the beginning probability from the ending probability, yields $\eta$.

| complete | |
|---|---|
| for all | $[k,p',B_1,\gamma,j',,i,\sigma_o,\sigma]$ |
| and rules | $[f,p,A,\alpha,j,B_2\beta,k,\rho_o,\rho]$ |
| and | unify $(B_1,B_2,B_3)$ |
| add | $[f,p,A,\alpha B_3,j+1,i,\rho_o,\rho+(\sigma-\sigma_o)]$ |

To complete the symbol, there is a state that begins at some time k and ends at some time i, containing the symbol V for which the final probability is $\sigma$ and the initial probability is $\sigma_o$. Then for each state looking for a symbol $B_2$ which unifies with the symbol $B_1$ to $B_3$, the processor produces a new state which has seen $B_3$, and which has the same rule number as the state being completed, has the same starting time as the state being completed, namely f, and the number of symbols completed is incremented to $j+1$. The ending frame is current frame i, the initial probability is the initial probability of the state being completed, $\rho_o$, and the ending probability is the ending probability of the symbol $B_3$ being seen which is $\sigma-\sigma_o$, determined by subtracting the starting probability from the ending probability for each state.

| hypothesize | |
|---|---|
| for all | $[f,p,A,\alpha,j,b\beta,i,\rho_o,\rho]$ |
| and | terminal(b,l), compute $(\rho,\rho')$ |
| predict at $1+1$ | $[i,\_,b,\_,\_,\_,\_,\rho',\rho']$ |
| finally, | call parse at $1+1$ |

To hypothesize, the processor takes a terminal symbol b from a state needed to advance a given state or a set of states. For all terminals "b" at a given level 1, the processor computes a new probability based on the ending probability $\rho$ of the state, $\rho'$. This is part of the delayed commitment algorithm. Since the processor is at a terminal symbol, it can then perform this algorithm because all states have been predicted and completed and there is no more information available to enable it to predict or complete any more states. The processor will predict at level $1+1$, which is the next lower level. That is indicated by symbol b at the current frame with initial and ending probabilities $\rho'$. The processor then loops down to the bottom level, advances as many states as possible and then returns to parse. This shows a mutually recursive relationship between hypothesize and parse.

| scan | |
|---|---|
| for all | make $E_{l,i+1}$ *empty* |
| | $[f,p,A,\alpha,j,b_1\beta,k,\rho_o,\rho]$ |
| for all observations | $[k,p_{l+1},b_2,\gamma,j',\epsilon,i+1,\sigma_o,\sigma]$ |
| at $1+1$ | |
| and | unify $(b_1,b_2,b_3)$ |
| add | $[f,p,A,\alpha b_3,j+1,\beta,i+1,\rho_o,\rho+(\sigma_o-\sigma)]$ |

Scan is essentially the same as complete. The only difference is that "complete" deals with nonterminal symbols and "scan" deals with terminal symbols. First the processor makes the state set at level 1, frame $i+1$, empty. For all observations at the next lower level which, for example, have $b_1$ in the left hand side, and that $b_1$ unifies with some symbol $b_1$ in some state at this level that needs that terminal symbol, the processor advances the state by putting the unified symbol $b_3$ on the advanced completed symbol list in this state at the beginning frame of the state that is being completed. Its probability is $\rho$, that is the ending probability of that state plus the ending probability of the completed state minus the initial probability of the completed state.

| add | |
|---|---|
| given | $[f,p,A_1,\alpha_1,j,\beta_1,i,\sigma_o,\sigma]$ |
| if there exists | $[f,p,A_2,\alpha_2,j,\beta_2,i,\rho_o,\rho]$ |
| and | subsumes$(A_1,A_2)$ |
| replace | $\rho$ with max$(\rho,\sigma)$,symbolically |
| otherwise | append the given state to $E_{l,i}$ |

To add, there must be given a state that differs from a current state in the state set. Furthermore, assuming the new left hand side symbol $A_1$ subsumes the existing symbol $A_2$, which means the processor has something more general to hypothesize than the first hypothesis, the processor symbolically replaces the existing probability of the existing state in the state set with the maximum of $\rho$ and sets $\sigma$ as the ending probability of the given state. It does not evaluate $\rho$ or $\sigma$, but instead marks the ending in the existing state set, thereby noting it has been added until the processor can later look up the probability and find the maximum. Otherwise the processor will just append the given state to the state set at level 1 of frame i, because there is no other existing subsumming state.

Efficient implementation of the algorithm depends on use of some details set out in Earley's work. These details include: keeping a linked list of alternatives for each nonterminal when the processor is in the prediction step, so they can be easily found; the states in the state set are also kept in a linked list so they can be processed in order; the states are indexed in a state set S by their starting points making it easy to determine if a state has already been added so the processor does not do it again; processing null or empty productions by making a note that the symbol has already been seen; and keeping all states organized according to the symbol they need so that when the processor has a complete symbol it can find them efficiently. Furthermore, inherent throughout the program is a compute function. When finding probabilities for terminal symbols, it is up to the compute step to note cycles and efficiently find the probability of a given state.

Looking now at FIG. 3, an example of frame synchronous parsing using probabilities is demonstrated. In the portion labeled A, a simple grammar is given which consists of one rule, namely sentence rewrites to a noun and a verb. One noun "boys" and two verbs "sleep" and "leap" are given.

The portion of FIG. 3 labeled B discloses a word lattice, which is the input to the system (in this example) showing the beginning and ending frames of each of the word hypotheses. The lattice contains a plurality of lines which show the logarithmic probability of seeing a particular word over a particular span of data and gives such probability as a negative number. According to the word lattice seen in portion B, the probability of finding "boys" from frame 0 to frame 2 is −0.04, that of finding "boys" from frame 0 to frame 2 is −0.03, that of finding "sleep" from frame 2 to frame 5 is −0.05 and that of finding "leap" from frame 3 to frame 5 is −0.03.

Considering now the portion of FIG. 3 labeled C, at frame i=0, a prediction is done and a state is established based on the rule "sentence rewrites to noun and verb", and is begun at time zero. This is denoted by the subscript before the S of 0 and a subscript after the arrow of 0. The dot above that refers to the place in the rule or how far one has progressed through the rule which, at this point, is none. The numbers at the end of the rule represent the logarithmic probabilities of the initial and final probabilities, respectively. At frame i=0, since the parser is still in the same state and has not done anything, the probability is zero. The first state came about because of predicting the start symbol S. At frame 0 there was a state corresponding to the rule S and the parser predicted the rule for the noun which is noun rewrites to "boys" which has the same starting and ending time as the previous state of 0 and the same starting and ending probabilities of the previous state of 0.0. The starting probability represents the probability of wanting to start this hypothesis and the ending probability represents having seen as much of the hypothesis as has been seen.

When the parser has predicted and completed as much as it can, it has a set of terminal symbols that it needs to see before it can go on and the set consists of one element which is "boys". It then looks at frame i=1 for some input, and sees none. It proceeds on to look at frame i=2 for some input and sees "boys" from frame 0 to frame 2, with an initial probability of 0.0 and an ending probability of −0.04. It then scans that terminal symbol into the previous noun state and advances the dot past "boys" which represents the act of seeing "boys" and puts an ending frame of 2 on that state and adjusts the final probability of the state to −0.04. Once it has a complete noun from frame 0 to frame 2, it checks if there are any symbols that ended at zero that needed a noun that it can complete and finds there was one starting with S in the very first state. It then creates a new state that indicates it has seen a noun by having the dot after the n and indicates that the noun extends to frame 2 with the same probability, −0.04, as its ending probability. When it has done all the predicting and completing it can do, it sees that it needs a verb indicated by v. There are two verb rules, so it predicts them. One is "sleep" and the other is "leap", both beginning at frame 2 and having initial and final probabilities of −0.04.

The parser then looks at frame i=3 for input. There it sees "boys" again with the probability of −0.03. Scanning the input "boys" from frame 0 to frame 3 the parser creates a new state, indicated in FIG. 3 as state 7, which is the noun "boys" from frame 0 to frame 3 with the probability of −0.03 Then it checks if it has any states that ended at 3 that needed a noun as before and finds the same state needs it, but this time the noun ends at frame 3 and has an ending probability of −0.03. The two noun hypotheses ("boys" from frame 0 to frame 2 and "boys" from frame 0 to frame 3) are non-intersecting hypotheses since they have different stop times, and therefore remain separate.

Now the parser sees that at frame 3 it needs a verb from state 8 so it predicts that verb and creates states 9 and 10 that both begin at frame 3 and end at frame 3. One of the newly created states needs the terminal "sleep" and one needs terminal "leap", both of which have the same beginning and end probabilities of −0.03. It looks at frame i=4 for data and finding none, looks at frame i=5 for data. There it sees both "sleep" and "leap", but "sleep" begins at frame 2 and "leap" begins at frame 3. It creates two new states: state 11 with an initial probability of −0.04 for "sleep" starting at frame 2 and with an ending probability of −0.09, and state 12 with an initial probability of −0.03 for "leap" starting at frame 3 and with an ending probability of −0.06. The ending probabilities are calculated by adding the intial probability plus the probability of seeing the particular word from its starting frame to its ending frame. The parser now has two complete verb symbols and it extends, or looks, for states that need a verb that starts at either frame 2 or frame 3 and finds an S that corresponds to both back in state 8 and state 4. Now the parser has a complete state corresponding to the start symbol S in state 13 and one corresponding to the start symbol S in state 14, although the middle states for each are different. Since the parser has probabilites of −0.09 on state 13 and 0.06 on state 14, it chooses the best one, which is −0.06, and traces back through the parse state to find "boys leap". This phrase will then be outputted as the speech recognition processor's best explanation for the spoken input given. The desired probability is that which is most positive, or as seen in this example, the least negative.

FIG. 4 is an example of a typical left recursive rule showing rule probabilities, using a treatment of conjunctions and disjunctions such as "a or b or d". As seen in portion A of FIG. 4, the example shown has the four terminal symbols: a, b, d and "or". The input is assumed to start at frame 0 and have one frame for each word of a or b or c ending at frame 5. The tree in portion B reflects the desired outcome of this parse. The tree shows that to recognize this input the parser has to use a left recursive rule two times and the non-left recursive S choice, which is S goes to C, once at the bottom. The tree also shows the rule probabilities. The probability of parsing this input is the product of all the rule probabilitiesthat are given in portion C of FIG. 4. The trace seen in Portion D of FIG. 4 shows the behaviour of the algorithm with these rule probabilities with respect to the input. The input is shown down the middle of portion D (a or b or c) and the various states that arise after each of these inputs are being shown in at the left. Because the chart parser parses symbols only once, it can specifically treat left recursive rules. To add the probabilities correctly, it is very important that the predict function add the rule probabilitiy onto the final probability of the state, not to add it onto the initial probability of the state. Thus each time the state is used the rule probability will then be added into subsequent states using the previous state. At the bottom of the trace, it is seen that the one-third arises the correct number of times (3), the 0.4 arises twice, and the 0.6 arises once, which accurately reflect the number of times the left and nonleft recursive rule were applied.

FIG. 5 is a graph showing the effect of chart parsing by the present invention on pruning. The graph considers time versus logarithmic probability of hypotheses. Each of the dots represent the same hypothesis symbol at times $t_i$ and $t_k$. The top line represents the best probability of any symbol on any explanation. The bottom line represents the best plus some predetermined log probability amount, or threshold. With other algorithms, if the probability of a symbol drops below that threshold at any point, it is discarded. With chart parsing as embodied in the present invention, since the parser only parses a symbol once at a given time frame, no matter how many times it is needed, and no matter how bad a probability it has, as long as it is above the pruning threshold the parser uses the best probability of that symbol. Furthermore, when the best probability symbol completes, the parser will then associate the lower probability symbols with their starting states. It then completes their states and, as may be the case, and as shown in FIG. 5 by the crossed lines, this lower probability symbol actually ends up as the best explanation of the data and the processor is able to then recognize the input properly whereas it would have been misrecognized in other algorithms.

While a specific embodiment of the invention has been shown and described, it should be understood that numerous variations and alternate embodiments will occur to those skilled in the art. Accordingly, it is intended that the invention be limited only in terms of the appended claims.

I claim:

1. A method for recognizing a spoken input representing a plurality of words, comprising the steps of:

(a) inputting a desired spoken input composed of a plurality of grammar levels;
(b) inputting grammars having terminal and non-terminal symbols for defining allowable sentence structures;
(c) inputting a lexicon having entries for defining terminal symbols of the grammar in terms of linguistic, syntactic or semantic features;
(d) generating a matrix of state sets;
(e) initializing said state sets;
(f) reading said desired spoken input;
(g) predicting initial and final probabilities for a current frame for each start symbol of grammar;
(h) parsing said start symbols according to said spoken input and grammars to produce observations of said symbols based on delayed commitment calculation of said predicting step; and
(i) explaining said spoken input based on the observations of said step of parsing.

2. The method for recognizing spoken sentences of claim 1, further comprising the steps of:

(j) between steps (d) and (e) reading an ending frame indicator; and
(k) after step (h), incrementing a frame counter.

3. The method for recognizing spoken sentences of claim 1, wherein said step (h) of parsing includes the steps of:

(j) predicting a valid next nonterminal symbol to thereby create at least one state from its corresponding at least one rule according to the grammar;
(k) completing said at least one state as explanations for symbols become available;
(l) generating a probability score for each said completed state;
(m) repeating steps (j) to (l) until no new states can be created;
(n) parsing terminal symbols from the current grammar level as start symbols for the next lower grammar level unless at the lowest grammar level;
(o) if at said lowest grammar level, comparing features of said spoken input with features of the predicted next lexical entries;
(p) scanning observations from said next lower grammar level into waiting states of said current grammar level;
(q) repeating steps (j) through (p) until no new states can be completed;
(r) reporting complete states corresponding to start symbols of said current level to the next higher grammar level;
(s) parsing said start symbols according to the spoken input and grammars to produce observations of said symbols; and
(t) explaining the input based on the results of said step of parsing.

4. The method for recognizing spoken sentences of claim 3, further comprising the steps of:

(u) between steps (d) and (e) reading an ending frame indicator; and
(v) after step (g), incrementing a frame counter.

5. The method of claim 3, wherein said probability score for said completed state is the probability for completing states in the state set using already complete states in the state sets.

6. The method of claim 3, wherein said score is calculated by summing the ending probability of the active state with the difference between the ending and initial probabilities of the complete state, wherein the active state is the state requiring the symbol which the complete state defines.

7. The method of claim 3, wherein a complete state is a state which fully explains a segment of the spoken input.

8. The method for recognizing spoken sentences of claim 1, wherein said state sets are 1 rows corresponding to the number of grammar levels and N columns correspondong to the number of input frames of speech.

9. The method for recognizing spoken sentences of claim 1, wherein said grammar is a stochastic unification grammar.

10. The method for recognizing spoken sentences of claim 1, wherein said grammar is a context-free or regular grammar.

11. A system for recognizing a spoken sentence representing a plurality of words, comprising:
a processing means;
a grammar coupled to said processing means for defining sentences in terms of elements of a language model;
a lexicon for defining elements of the grammar in terms of symbols;
a parser coupled to said grammar for combining words into partial sentences, for generating sets of states and for determining completed states;
a predictor coupled to said grammar and said processing means for predicting the symbols of valid next elements generated by said parser;
a completer for explaining the results from the parser; and
output means coupled to said processing means for generating the explanation developed by said completer.

12. The system for recognizing a spoken sentence of claim 11, further comprising a means for generating a chart, wherein the chart is accessed by said parser, said predictor, and said completer for storing intermediate results.

13. The system for recognizing a spoken sentence of claim 12, wherein the chart comprises states and state sets, said states to be manipulated by said parser and said predictor.

14. The system for recognizing a spoken sentence of claim 11, further comprising a scanner coupled to said parser and said completer, for reading symbols from the parser to the completer.

15. The system for recognizing a spoken sentence of claim 11, further comprising a knowledge base for supplying symbols, wherein said predictor is coupled to said knowledge base.

16. The system for recognizing a spoken sentence of claim 11, wherein said language model incorporates stochastic unification grammars.

17. The system for recognizing a spoken sentence of claim 11, wherein said language model incorporates context-free or regular grammars.

18. The system for recognizing a spoken sentence of claim 11, wherein said processing means includes an input means for recording spoken words and an acoustic device for tranforming spoken words into a medium readable by said processing means.

19. The system for recognizing a spoken sentence of claim 11, wherein said processing means is coupled to a translating means adapted to receive spoken input and transform said input into a medium readable by said processing means.

20. A system for parsing a spoken sentence having a plurality of words, comprising:
input means for recording spoken words;
a processing means;
an acoustic device for transforming spoken words into a medium readable by said processing means;
a grammar coupled to said processing means for defining sentences in terms of elements of a language model;
a lexicon for defining elements of the grammar in terms of symbols or features;
a parser coupled to said grammar for combining words into partial sentences, for generating sets of states and for determining completed states;
a predictor coupled to said lexicon and said processing means for predicting the symbols of valid next elements generated by said parser;
a means for generating a chart, wherein the chart is accessed by said parser and said predictor for storing intermediate results;
a completer for explaining the results from the parser;
a scanner coupled to said parser and said compiler for reading symbols and features from the parser to the completer; and output means coupled to said processing means for generating the explanation developed by said completer.

21. The system for parsing of claim 20, wherein the chart comprises states and state sets, said states to be manipulated by said parser and said predictor.

22. The system for parsing of claim 20, further comprising a knowledge base coupled to said predictor for supplying symbols and appropriate operating data.

23. The system for parsing of claim 20, wherein said language model incorporates stochastic unification grammars.

24. The system for parsing of claim 20, wherein said language model incorporates context-free grammars.

25. A method for parsing a spoken sentence having a plurality of words, comprising the steps of:
(a) inputting a desired spoken input composed of a plurality of grammar levels;
(b) inputting at least one grammar having terminal and nonterminal symbols for defining allowable sentence structures;
(c) inputting a lexicon having entries for defining terminal symbols of said at least one grammar in terms of linguistic, syntactic or semantic features;
(d) generating a matrix of state sets;
(e) initializing said state sets;
(f) reading said desired spoken input;
(g) predicting initial and final probabilities for a current frame for each start symbol of grammar;
(h) predicting a valid next nonterminal symbol to thereby create at least one state from its corresponding at least one rule according to said at least one grammar;
(i) completing said at least one state as explanations for symbols become available;
(j) generating a probability score for each said completed state;
(k) repeating steps (h) to (j) until no new states can be created;
(l) parsing terminal symbols from the current grammar level as start symbols for the next lower grammar level unless at the lowest grammar level;
(m) if at lowest grammar level, comparing features of the spoken input with features of the predicted next lexical entries;

(n) scanning observations from said next lower grammar level into waiting states of said current grammar level;

(i) repeating steps (h) through (n) until no new states can be completed;

(p) reporting complete states corresponding to start symbols of said current level to the next higher grammar level;

(q) parsing said start symbols according to the spoken input and grammars to produce observations of said symbols; and (r) explaining the input based on the results of said step of parsing.

26. The method for parsing of claim 25, wherein a complete state is a state which fully explains a segment of the spoken input.

27. The method for parsing of claim 25, further comprising the steps of:

(s) between steps (d) and (e), reading an ending frame indicator; and (t) after step (n), incrementing a frame counter.

28. The method for parsing of claim 25, further comprising the steps of:

(s) between steps (d) and (e), reading an ending frame indicator; and (t) after step (k), incrementing a frame counter.

29. The method for parsing of claim 25, wherein said state sets are 1 rows corresponding to the number of grammar levels and N columns corresponding to the number of input frames of speech.

30. The method for parsing of claim 25, wherein said grammar incorporates context-free or regular grammars.

31. The method for parsing of claim 25, wherein said grammar incorporates stochastic unification grammars.

32. The method of parsing of claim 25, wherein said probability score for said completed state is the probability for completing states in the state set using already complete states in the state sets.

33. The method of parsing claim 25, wherein said score is calculated by summing the ending probability of the active state with the difference between the ending and initial probabilities of the complete state, wherein the active state is the state requiring the symbol which the complete state defines.

* * * * *